Patented Mar. 7, 1939

2,149,962

UNITED STATES PATENT OFFICE 2,149,962

SOLDERING FLUX

William H. Holst, Tamaqua, Pa., assignor to Atlas Powder Company, Wilmington, Del., a corporation of Delaware No Drawing. Application December 11, 1937, Serial No. 179,281

4 Claims. (Cl. 148—23)

This invention relates to the art of soldering and in particular to soldering fluxes suitable for joining metals which may ordinarily be soldered.

An object of the invention is to provide a fluxing agent which is non-corrosive at ordinary temperatures and which is very active at soldering temperatures.

A further object of the invention is to provide a fluxing agent which is non-hydroscopic but which is water soluble.

Another object is to provide a flux which at the temperatures of application is a solvent for the oxide film usually existing on metals, and thus to provide a chemically clean surface which will permit of the metallic surface being wetted easily by the solder.

Still another object of the invention is to provide a flux which will quickly penetrate the joints to be soldered.

A still further object of the invention is to provide a flux which will not decompose to materials which will either interfere with the process of soldering or cause objectionable odors at the time of application. The invention further provides for the use of an organic material which will not decompose to carbon at either the fluxing or soldering temperature.

A further object of the invention is to provide a fluxing material which is non-toxic and may be used in the soldering of containers for shipments of food.

One essential for satisfactory soldering one metal to another is that the metals to be soldered must be thoroughly clean as the strength of the soldered joint depends upon the adhesion resulting from the intimate contact between the solder and the surface of the thing soldered. The solder must wet the surface, and wetting is perfect only when solder and surface are chemically clean and when the conditions of relative surface tension between the solder and the surface are satisfactory. The layer of oxide on the metals to be joined should be removed and the oxide-free metallic surfaces protected until wetting by solder has occurred. Consequently, the flux must not only have the ability to clean the solder and surfaces to be soldered, but must also have the ability to maintain this condition of cleanliness up to the soldering temperature.

Heretofore fluxes used to prepare a chemically clean surface have been acids or their salts, such as muriatic acid and zinc chloride, or materials, such as rosin. These compounds react with the oxides of the surfaces to be soldered, but have the objectionable features that they are corrosive under normal conditions and, in some cases, toxic. The surfaces which have been soldered with the aid of such fluxes must be thoroughly cleaned after the process of soldering is finished so that after-corrosion is eliminated.

Another essential of good soldering practice is that water be eliminated because it may remain in the crevices of the two metals soldered and cause after-corrosion. Water will also tend to leave bubbles in the solder itself, thereby weakening the joints. In the case of fluxes composed of salts containing water of crystallization, it is necessary that the water be eliminated before effective work can be done by the molten salts.

It is a further essential of good soldering practice that wetting of the metals by solder should commence at the instant that the solder alloy melts, and consequently the flux should melt below the melting point of the solder so as to react with the oxide coated metal surfaces. For example, if the melting point of a tin-lead solder is 180° C. it is essential that the flux melt below this temperature, and that it remove the oxide before the melting point of the solder is reached. For this reason zinc chloride which melts at 262° C. is not entirely satisfactory, for while the aqueous solution flux will melt below the melting point of the zinc chloride, the evaporation of water leaves in the joint particles of solid zinc chloride which melt at approximately 80° above the melting point of the solder. A satisfactory flux should quickly penetrate the joints and quickly react with the oxide surface, and it is for this reason that most fluxes have been used either in the molten state or as water solutions.

Now it has been found that mannitol, a hexahydric alcohol, is a very satisfactory flux for soldering metallic surfaces. Mannitol is a crystallin material of melting point 165–167° C., is non-hygroscopic, non-toxic, water soluble and non-corrosive at normal temperatures. Mannitol not only dissolves alkaline earth oxides when the latter are added to its solutions, but in the molten state mannitol is a solvent for the oxide film existing on most metals which are used in making soldered joints. For example, oxide coated pieces of copper, tin and lead, when covered with a layer of mannitol crystals, subjected to heat until the mannitol melted, and allowed to stand for a few minutes, showed a bright, clean metallic surface upon cooling and removal of the solidified mannitol. In other words, mannitol exhibits the properties of the ideal flux—it melts at a lower temperature than the solders ordinarily used, it removes the oxide film quickly and thoroughly and it provides a material which is non-toxic and has no corrosive effect on the metal after the soldering operation has been performed. Mannitol is also non-hygroscopic and this property is of utmost importance in a soldering flux.

While water solutions of mannitol may be used as the fluxing agent for soldering, this is considered undesirable because water must be evaporated before the mannitol can begin its chemical cleaning function, and this slows up the soldering operation. Furthermore, minute traces of water may be left in the soldered joint with the result that after-corrosion takes place. Water solutions also tend to leave bubbles in the solder. Molten mannitol may be satisfactorily employed in soldering operations where speed of soldering is not essential but it requires that a bath of molten mannitol be maintained above its melting point and this is both expensive and inconvenient, especially where small metallic objects have to be soldered.

Now I have found that permanent suspensions of mannitol which are highly desirable fluxing agents may be prepared by suspending mannitol in suitable volatile, non-aqueous, organic liquid. By means of these permanent suspensions, it is possible to use mannitol for soldering objects which are handled at great speed through automatic soldering machines. The suspensions of mannitol have a satisfactory surface tension so that penetration of crevices takes place rapidly and there is no after-corrosion effect due to a residue of liquid or solid fluxing agent as mannitol, under normal conditions, is not corrosive. Furthermore, any excess mannitol may be readily removed after the soldering operation is completed by washing the soldered article with hot water.

The organic, volatile, non-aqueous liquid employed as the suspension medium preferably has a density of about that of the mannitol crystals (1.489), so that the suspension will be permanent and there will be no settling out of the mannitol which would cause inconvenience in the handling of the material through pipe lines and apertures. The organic liquid in which the mannitol is suspended may be a single liquid of a density of about that of mannitol or a composition of a plurality of liquids, the density of the composition being about that of mannitol. The liquid compositions are preferred in that they enable the utilization of liquids which would be unsuitable for use alone, and further, in that by choice of suitable liquids the properties of the composition, such as boiling point and surface tension, may be varied.

In the following non-limiting examples of the preparation of soldering fluxes of the present invention, the percentages represent volume:

*Example 1*

A volatile liquid composition of the following formula:

| | Per cent |
|---|---|
| Butyl cellosolve (ethylene glycol monobutyl ether) | 15.3 |
| Carbon tetrachloride | 84.7 | was prepared by admixing the two liquids in the proportions indicated. The liquid composition had an initial boiling point of 76.6° C. and, at 25° C., a density of 1.489 and a surface tension of 26.84 dynes/cm. Mannitol in the form of fine crystals was added to the liquid composition to the extent of 20% and the mixture was agitated until the mannitol was thoroughly dispersed throughout the liquid. The rate of settling of the mannitol from the composition so produced was found to be negligible and the suspension was substantially permanent.

*Example 2*

A mannitol suspension was prepared in accordance with the procedure of Example 1, except that the liquid composition of Example 1 was replaced with a composition having the following formula:

| | Per cent |
|---|---|
| Butyl carbitol (diethylene glycol monobutyl ether) | 16.5 |
| Carbon tetrachloride | 83.5 |

This liquid composition had an initial boiling point of 76.1° C. and, at 25° C., a density of 1.488 and a surface tension of 27.15 dynes/cm. The rate of settling of the mannitol from the suspension was negligible and the suspension was permanent.

*Example 3*

A mannitol suspension was prepared in accordance with the procedure of Example 1, except that the liquid composition of Example 1 was replaced with a composition of the following formula:

| | Per cent |
|---|---|
| Ethyl alcohol | 13 |
| Carbon tetrachloride | 87 |

The liquid composition had an initial boiling point of 61.5° C. and, at 25° C., a density of 1.487 and a surface tension of 25.81 dynes/cm. The rate of settling of the mannitol from the suspension was negligible and the suspension was substantially permanent.

*Example 4*

A mannitol suspension was prepared in accordance with the procedure of Example 1, except that the liquid composition of Example 1 was replaced with a composition of the following formula:

| | Per cent |
|---|---|
| Acetone | 13 |
| Carbon tetrachloride | 87 |

This liquid composition had an initial boiling point of 67.5° C. and, at 25° C., a density of 1.488 and a surface tension of 26.20 dynes/cm. The rate of settling of the mannitol from the suspension was negligible and the suspension was substantially permanent.

When the fluxes of the foregoing examples are employed in soldering, the liquid mixtures used for suspending the mannitol are completely volatilized at the temperature of soldering, as is indicated by the boiling points of the liquid compositions. Furthermore, the boiling points are so low that the respective liquid compositions used do not decompose into corrosive non-volatile materials that would remain in the soldered joint.

In preparing the suspension of mannitol in the volatile liquid, the mannitol may be added to the liquid in the form of fine crystals and the mixture agitated by hand or mechanical means. If desired, however, a mixture of the mannitol crystals and one of the less volatile ingredients of a composition, such as the butyl cellosolve of Example 1, may be passed through a homogenizer or colloid mill to reduce the mannitol crystals in size and to disperse them thoroughly throughout the liquid. Thereafter, the dispersion so formed may be mixed with the other liquid ingredients of the composition.

Non-limiting examples of the application of soldering fluxes of the present invention are as follows:

Example 5

Tin to be soldered was treated with an excess of the mannitol flux of Example 1 and solder was then applied in the usual manner, with a hand soldering iron. The soldering operation proceeded more smoothly than in a comparative operation with rosin flux and the soldered joint had a smoother finish than when rosin was employed. The mannitol flux which came into contact with the soldering iron melted freely and cleaned the metal thoroughly so that the bond of the two metals, after soldering, was of great strength. This procedure, when repeated, with the use of each of the compositions of Examples 2 to 4, produced equally good results.

Example 6

Bridge wires, similar to those used in the manufacture of electric detonators, and made of an alloy consisting of 80% nickel and 20% chromium, were soldered to brass and cupro-nickel with the aid of the soldering flux of Example 1. The diameter of the nickel-chromium bridge wire was 0.0015 in. The brass and cupro-nickel parts were treated with an excess of the mannitol suspension and the bridge wire soldered thereto. An inspection of the articles to which the bridge wire was attached showed that the soldered joints were much more satisfactory than the soldered joints of comparative operations where rosin had been employed as the flux.

This procedure, when repeated with the compositions of Examples 2 to 4 as the soldering flux, produced equally good results.

Although specific examples have been set forth for the purpose of describing the invention in full, clear and concise terms, the invention is not to be considered as limited to particular organic liquid materials or proportions thereof, as it is apparent that many modifications may be employed without departing from the invention. For example, carbon tetrachloride is preferably employed as one ingredient of the liquid composition, but other organic compounds such as carbon tetrabromide, bromodichloromethane and iodomethylether may be used in place of all or part of the carbon tetrachloride by suitably varying the proportions of the liquid ingredients. Chloroform and methyltrichloroacetate are organic liquids which have a density of about that of mannitol and which may be employed alone as suspension media. The amount of mannitol present in the suspension may vary over wide limits, but is preferably between 5 and 25%. Other fluxing agents may be employed along with the mannitol suspensions if so desired. Rosin, for example, is readily soluble in several of the liquid ingredients capable for use in the preparation of the mannitol suspensions and may be applied to the parts to be soldered along with the mannitol suspension, either by separate application or by dissolving it in one of the liquid ingredients of the suspension.

Accordingly, the invention includes within its purview any modification falling within either the terms or the spirit of the appended claims.

What I claim is as follows:

1. A soldering flux comprising a substantially permanent suspension of mannitol in a volatile, non-aqueous organic liquid, said liquid having a density of about that of mannitol and being of volatility such that it will volatilize below the melting point of mannitol without decomposition into corrosive, non-volatile materials.

2. A soldering flux comprising a substantially permanent suspension of mannitol in a non-aqueous, organic liquid composition comprising at least two ingredients in such proportions that the density of the liquid composition is about that of mannitol and the boiling point of the liquid composition is below the melting point of mannitol.

3. A soldering flux as set forth in claim 2 and wherein the flux contains from 5 to 25% of mannitol in suspension.

4. A soldering flux comprising a substantially permanent suspension of mannitol in a non-aqueous liquid composition comprising carbon tetrachloride and at least one compound selected from the group consisting of ethylene glycol monobutyl ether, diethylene glycol monobutyl ether, ethyl alcohol and acetone, the ingredients of the liquid composition being present in such proportions that the density of the liquid composition is about that of mannitol and the boiling point of the liquid composition is below the melting point of mannitol.

WILLIAM H. HOLST.